United States Patent
Hévizi et al.

(10) Patent No.: US 10,687,274 B2
(45) Date of Patent: Jun. 16, 2020

(54) SELECTING RADIO ACCESS FOR MOBILE TERMINALS

(71) Applicant: Telefonaktiebolaget LM Ericsson (publ), Stockholm (SE)

(72) Inventors: László Hévizi, Piliscsaba (HU); Peter Vaderna, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 134 days.

(21) Appl. No.: 16/081,991

(22) PCT Filed: Mar. 11, 2016

(86) PCT No.: PCT/EP2016/055294
§ 371 (c)(1),
(2) Date: Sep. 4, 2018

(87) PCT Pub. No.: WO2017/152994
PCT Pub. Date: Sep. 14, 2017

(65) Prior Publication Data
US 2019/0281542 A1    Sep. 12, 2019

(51) Int. Cl.
*H04W 48/18* (2009.01)
*H04B 17/318* (2015.01)
(Continued)

(52) U.S. Cl.
CPC .......... *H04W 48/18* (2013.01); *H04B 17/318* (2015.01); *H04B 17/391* (2015.01);
(Continued)

(58) Field of Classification Search
CPC ..... H04W 48/18; H04W 24/04; H04W 24/10; H04W 36/32; H04W 16/18; H04W 16/22; H04B 17/318; H04B 17/391
See application file for complete search history.

(56) References Cited

U.S. PATENT DOCUMENTS

2004/0218605 A1    11/2004   Gustafsson et al.
2013/0260771 A1*   10/2013   Wirola ................ H04W 64/00
                                                              455/446
(Continued)

FOREIGN PATENT DOCUMENTS

EP    1933576 A1    6/2008
WO    2008032154 A1   3/2008

OTHER PUBLICATIONS

Piri, E., "Cell Coverage Area Information Service to Improve Cell Selection in HetNets", 2014 IEEE 11th Consumer Communications and Networking Conference (CCNC), Jan. 10, 2014, pp. 47-52, IEEE.

*Primary Examiner* — Will W Lin
(74) *Attorney, Agent, or Firm* — Coats & Bennett, PLLC

(57) ABSTRACT

There is provided a selecting of a radio access for a mobile terminal, comprising the steps of obtaining coverage information from a coverage information database for two or more nodes of the mobile communication network, obtaining configuration and/or state information from an inventory database for two or more nodes of the mobile communication network, and generating correlation information for two or more nodes correlating the coverage information obtained from the coverage database and the configuration and/or state information of nodes obtained from the inventory database.

20 Claims, 6 Drawing Sheets

(51) Int. Cl.
*H04B 17/391* (2015.01)
*H04W 24/04* (2009.01)
*H04W 24/10* (2009.01)
*H04W 36/32* (2009.01)
*H04W 16/18* (2009.01)

(52) U.S. Cl.
CPC ........... *H04W 24/04* (2013.01); *H04W 24/10* (2013.01); *H04W 36/32* (2013.01); *H04W 16/18* (2013.01)

(56) References Cited

U.S. PATENT DOCUMENTS

| | | | |
|---|---|---|---|
| 2016/0309345 A1* | 10/2016 | Tehrani | H04W 72/0426 |
| 2016/0323754 A1* | 11/2016 | Friday | H04W 16/28 |
| 2019/0150058 A1* | 5/2019 | Friday | H04B 17/318 370/328 |
| 2019/0277939 A1* | 9/2019 | Li | G01S 5/02 |

* cited by examiner

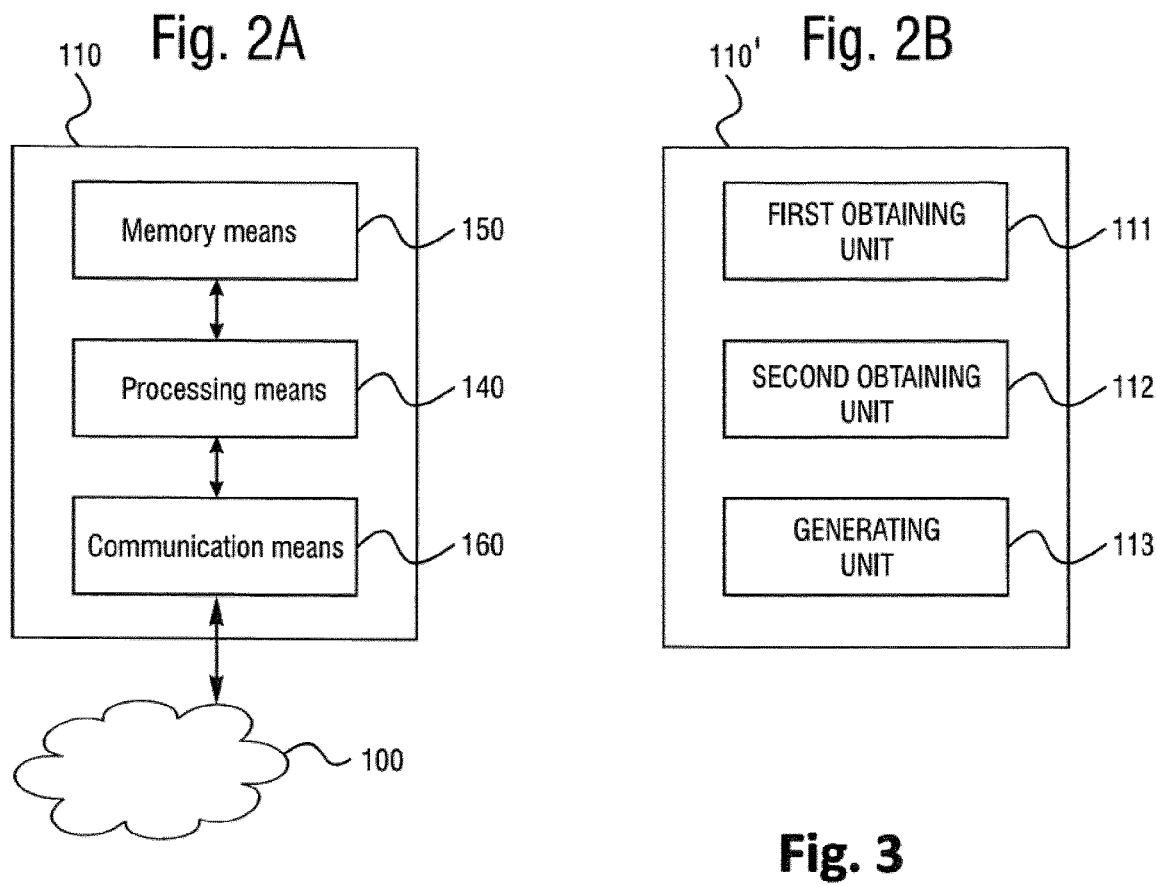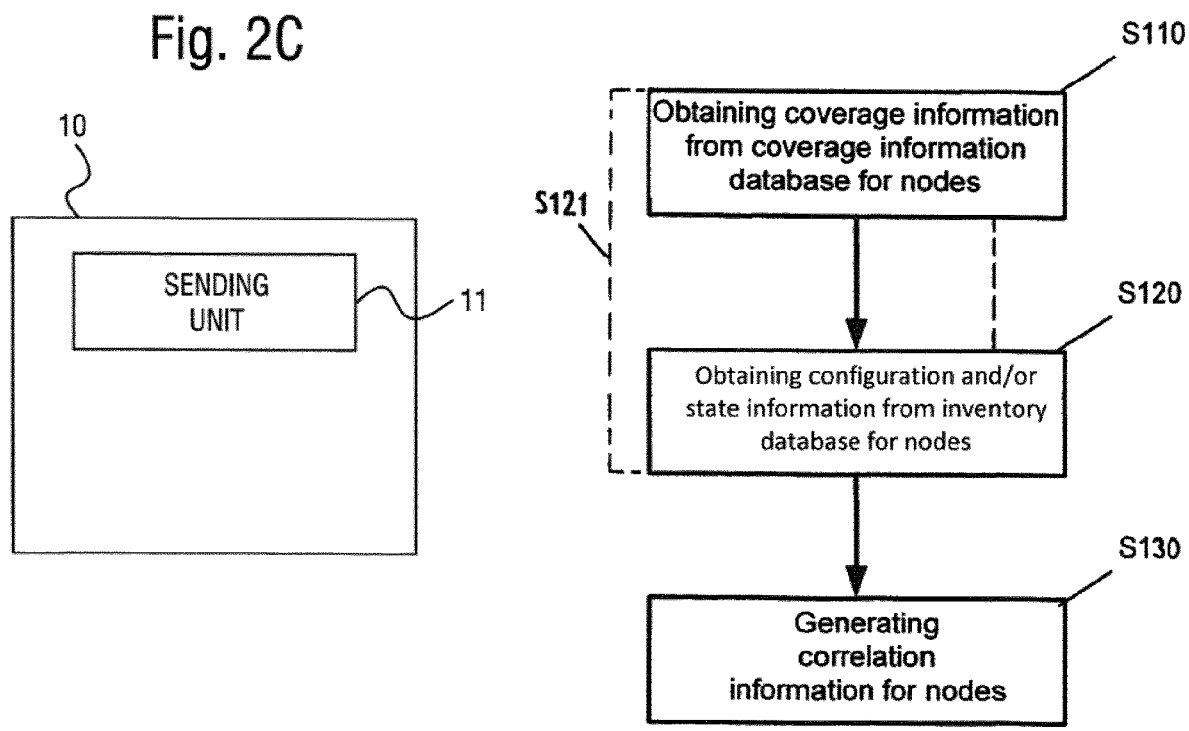

Fig. 9

|  | ... | C3_1 | C3_2 | C4_1 | C4_2 | C5_2 | ... |
|---|---|---|---|---|---|---|---|
| ... | 1 | ... | ... | ... | ... | ... | ... |
| C3_1 | ... | 1 | 0.28 | 0 | 0 | 0 | ... |
| C3_2 | ... | 0.3 | 1 | 0.2 | 0.2 | 0.25 | ... |
| C4_1 | ... | 0 | 1 | 1 | 0.05 | 0.45 | ... |
| C4_2 | ... | 0 | 1 | 0.05 | 1 | 0 | ... |
| C5_2 | ... | 0 | 0.85 | 0.3 | 0 | 1 | ... |
| ... | ... | ... | ... | ... | ... | ... | 1 |

SELECTING RADIO ACCESS FOR MOBILE TERMINALS

TECHNICAL FIELD

The present invention relates to a method for selecting a radio access for a mobile terminal. The present invention likewise relates to a network entity for performing the method for selecting a radio access for a mobile terminal. More specifically, the present invention relates to employing information on the coverage of a node and information on a state and/or configuration of a node in a mobile communication network. The present invention also relates to corresponding computer programs and computer program products.

BACKGROUND

A mobile communication network typically contains many different nodes providing radio access to mobile terminals. These nodes may be distributed over a specific area and the nodes may be distributed such that a specific service area is provided with radio access for the mobile terminals. Typically, homogeneous networks, i.e. networks complying with a single standard such as 3G and the like, are designed such that the corresponding nodes are distributed over the service area, wherein each corresponding node provides radio access in a specific coverage area. That is, the service area results from a combination of the coverage areas of the corresponding nodes.

In order to provide good service to a user, the coverage areas are usually overlapping such that a handover from one corresponding node to another corresponding node may be carried out without disconnecting a mobile terminal from radio access. Currently, it is sufficient for mobile terminals to scan in appropriate intervals for available radio access(es) at its present location and subsequently request a handover to a corresponding node providing radio access with a better service, e.g. providing the best signal strength at the location of the mobile terminal. However, scanning for potential radio access is time and energy consuming for the mobile terminal. For instance, there may be inter-frequency measurements employed, which may suspend ongoing services for short periods of time. In addition to this, in certain radio access technologies a radio discovery process may consume random access resources of the network.

Recently, there have been suggested heterogeneous networks for instance comprising different homogeneous networks using different radio access technologies. The heterogeneous network may comprise macro cells, micro cells, pico cells, and the like. The respective nodes providing radio access for the different cells may use different spectra and/or standards such as GSM, GPRS, 3G, 4G, LTE, Wi-Fi, WiMAX, and the like. However, if a mobile terminal would scan for all available radio accesses in a heterogeneous network, just as it would do in a homogeneous network, the costs with respect to time and energy would increase drastically, as for a given location of the mobile terminal there may be many different types of radio accesses available using different spectra and/or standards, which need to be of course scanned should they be intended to be discovered.

Therefore, there is a need for improved solutions with regard to exploiting available radio accesses and an improved solution that is able to select an optimum, or the best radio access for a mobile terminal, which is, at the same time, minimizes the consumption of energy and processing resources. In other words, it is an object of the present invention to provide a radio access selection solution that 1) can provide the optimum/best service for a mobile terminal for a given location of the mobile terminal, 2) is cost-effective, i.e. saves time and energy resources, and 3) provides a reliable selection process even after the setup of a network.

SUMMARY

The above-mentioned problems and drawbacks of the conventional solutions are addressed by the subject-matter of the independent claims. Further preferred embodiments are described in the dependent claims.

According to an aspect of the present invention there is provided a method for selecting a radio access for a mobile terminal in a mobile telecommunication network having nodes, comprising the steps of obtaining coverage information from a coverage information database for two or more nodes of the mobile communication network, obtaining configuration and/or state information from an inventory database for two or more nodes of the mobile communication network, and generating correlation information for two or more nodes correlating the coverage information obtained from the coverage database and the configuration and/or state information of nodes obtained from the inventory database.

According to another aspect of the present invention, there is provided a network entity for performing a method for selecting a radio access for a mobile terminal, the network entity comprising a first obtaining unit configured to obtain coverage information from a coverage information database for two or more nodes of a mobile communication network, a second obtaining unit configured to obtain configuration and/or state information from an inventory database for two or more nodes of a mobile communication network, and a generating unit configured to generate correlation information for two or more nodes correlating the coverage information obtained from the coverage database and the configuration and/or state information of nodes obtained from the inventory database.

According to another aspect of the present invention there is provided a computer program comprising code, wherein the code, when executed on processing resources, instructs said processing resources to perform a method embodiment of the present invention.

According to another aspect of the present invention there is provided a storage medium storing computer program code, wherein the code, when executed on processing resources, instructs said processing resources to perform a method embodiment of the present invention.

According to another aspect of the present invention there is provided a mobile terminal in a mobile communication network having nodes, the mobile terminal comprising a sending unit to send a coverage report to a network entity adapted to a method embodiment of the present invention.

BRIEF DESCRIPTION OF THE DRAWINGS

Embodiments of the present invention, which are presented for better understanding of the inventive concepts but which are not to be seen as limiting the invention, will now be described with reference to the figures in which:

FIGS. 2A, 2B show general entity embodiments of the invention for selecting a radio access for a mobile terminal;

FIG. 2C shows a general mobile terminal embodiment of the invention for selecting a radio access for a mobile terminal;

FIG. 3 shows a flowchart of a general method embodiment of the present invention;

FIG. 9 shows an exemplary table for storing correlation information for the node shown in FIG. 7.

DETAILED DESCRIPTION

Figure 1:
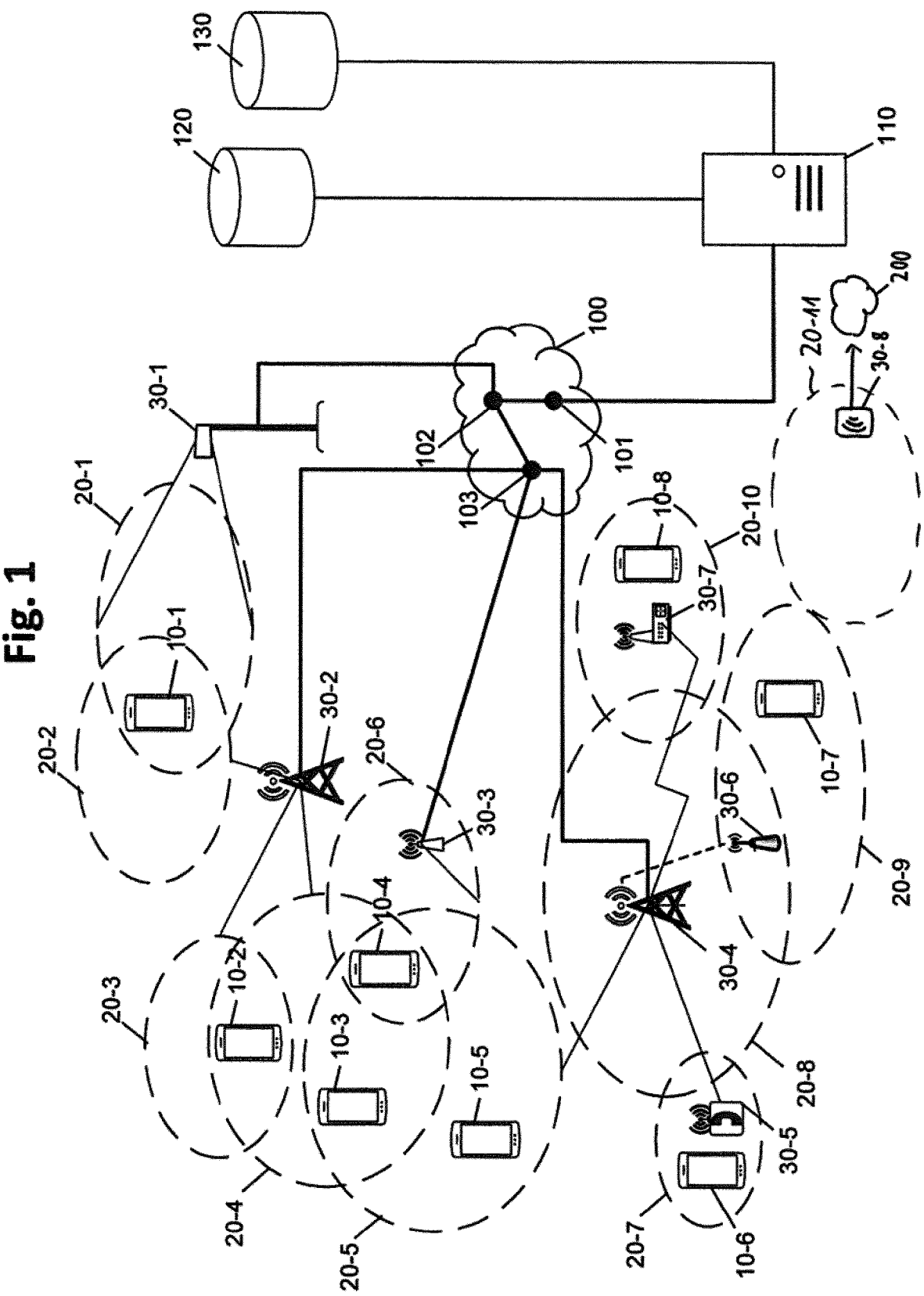
FIG. 1 shows a schematic overview of an exemplary network environment in which different types of nodes are providing radio access for mobile terminals.

FIG. 1 shows a schematic overview of an exemplary network environment in which a radio access can be selected for a mobile terminal according to one embodiment of the invention. A network 100, for instance a mobile communication network, includes a number of network elements 101-106, 30-1 to 30-7 such as network nodes, routers, gateways, switches, switching centers, base stations, wireless or wire-bound links and the like. In particular, the network may include or may be connected to nodes 30-1 to 30-7 providing radio access to mobile terminals in one or more coverage areas 20-1 to 20-10. Such radio access providing nodes may for instance be a macrocell base station 30-2, 30-4, a macrocell station 30-3, a picocell base station 30-7, a relay 30-6 relaying a signal to a macrocell base station 30-4, or any other radio access providing node 30-5.

Furthermore, there may be access points 30-8 (3G, 4G, 5G, IEEE 802.11 (Wi-Fi), IEEE 802.16 (WiMAX), etc.) that also provide one or more corresponding coverage area 20-11, where the access point 30-8 (i.e. also a node in the sense of the present disclosure) is independent from the network 100 and has a connection to another network 200, e.g. the Internet. In general, the term "node" relates in the context of the present disclosure to any physical entity that can provide a radio access to a mobile terminal, and which has, consequently some kind of coverage area, in which it can provide this radio access to the terminal.

In all, the radio access provided may, for instance depending on the type node, be of different spectra or supporting different standards such as GSM, GPRS, 3G, 4G, LTE, Wi-Fi, WiMAX and so on. However, the coverage area does not to be tied to a specific node, but can also be tied to a specific radio access technology, operating frequency, or one of a plurality of beams originating from a node. In a way, a node can be associated to the radio access in the sense that a node is the physical entity that provides the corresponding radio access in the corresponding coverage area. For example, one coverage descriptor can be associated to a GSM cell and another coverage descriptor to an LTE cell, while both coverage areas are served from the same base station (node) site.

In general, the purpose of the network 100 will be to provide a network service to a plurality of mobile terminals 10-1, 10-8, where the usual services include, telephony, video-telephony, chatting, internet-browsing, email access, and the like. For this purpose the network elements 101-103 will convey data via the nodes 30-1 to 30-7 to and from the plurality of mobile terminals 10-1 to 10-8. The nodes 30-1 to 30-7 may be connected to the individual mobile terminals 10-1 to 10-8 via radio links using different frequency spectra and supporting different standards for transmitting and receiving data to and from a mobile terminal 10-1 to 10-8. The network 100 may further have a connection to some sort of network entity 110, such as a server or a resource in a data center. In order to allow selecting a radio access for a mobile terminal 10-1 to 10-8, the present embodiment provides a network environment that is configured such that coverage information and configuration and/or state information for two or more nodes of the mobile communication network 100 may be obtained, as explained in greater detail below.

In one embodiment of the present invention the network entity 110 is connected to a coverage information database 120 and an inventory database 130. The network entity 110 may for instance obtain coverage information for two or more nodes 30-1 to 30-7 of the network 100 from the coverage information database 120. The network entity 110 may also obtain configuration and/or state information such as a geolocation for instance including GPS coordinates or any other coordinates to specify the location of each node 30-1 to 30-7 from the inventory database 130.

The coverage information database 120 and the inventory database 130 may be set up and maintained by a network management and may be updated in real time. The inventory database 130 may contain, besides the locations of the nodes 30-1 to 30-7, height and direction of antennas used by the nodes 30-1 to 30-7, i.e. configuration and/or state information of nodes.

In the prior art coverage information, if it exists at all, is handled entirely separate from the state, configuration, and/ or location of nodes 30-1 to 30-7. For instance if an optimization algorithm reconfigures one or more of the nodes 30-1 to 30-7, then also coverage areas 20-1 to 20-10 may change and such changes are conventionally not immediately reflected in the coverage information database 120. That is to say, coverage information is conventionally not used, in particular not in real time. In other words, coverage information was conventionally modelled by off-line cell planning tools and monitored by network management tools, but no dynamically changing coverage info was conventionally actively used for instance in inter-RAT handover support. Data bases for coverage maps and node-state may not be connected, in particular not in real-time.

In other words, large mobile networks may easily contain a relatively large number of radio nodes. Network management systems may maintain a central database of network nodes, but this database may not always integrate all segments of the network and it may not be updated all network management domains in real-time. Network vendors and operators may aim to automatize the maintenance of network inventory with employing plug and play techniques and automatic network configuration procedures.

According to a conventional solution, a separate unit may track the radio network coverage. There may be a one-way connection between the coverage information database and the inventory data base, which also may be called radio node inventory and coverage maps, a graphical coverage unit may take input from network inventory, but the coverage maps may not be directly referenced in the node inventory database. Conventionally, the coverage maps in the prior art are mostly used for network planning, coverage verification and testing.

However, if real-time network optimization is to be achieved, instantaneous measurements from users and network nodes, as well as, up to date coverage information may be necessary. An automatic neighbor relation (ANR) function, which is one of self-organized network (SON) features, is an example for real-time, automatic update of for instance configuration tables stored in the network inventory database. ANR may support automatic physical cell id provisioning and neighborhood relationship discovery. ANR is an example, where limited, but structured coverage information is utilized.

There may be further a large central network inventory database, which may only store the geolocations of radio network nodes and potentially, the height and direction of antennas. Coverage information, if at all existing, may be handled separately. If an optimization algorithm reconfigures nodes, then coverage changes may not be immediately reflected in the coverage databases, thus coverage info may be hardly used in real-time SON algorithms.

The network entity 110 uses the configuration and/or state information obtained from the coverage information database and the configuration and/or state information obtained from the inventory database to generate correlation information for two or more nodes 30-1 to 30-7. That is, according to one embodiment of the present invention, the network entity 110 may estimate the overlap of coverage areas 20-1 to 20-10 for at least two of the nodes 30-1 to 30-7. Generally, the databases will have entries for at least two nodes, and practically for a whole of a plurality of nodes that are to be considered by the database. Further, it may generally sensible only to generate correlation information for at least two nodes, since the correlation for one node may always be unity. As a consequence, the two or more nodes for which the correlation information is obtained may not be the same as the two or more nodes that are mapped by the inventory database or the two or more nodes that are mapped by the coverage information database.

That is, the network entity 110 may for instance determine the overlap between the coverage area 20-1 related to the node 30-1 which is providing a beam and the coverage area 20-2 related to node 30-2. Further, the network entity 110 may determine the overlap between coverage areas 20-4 related to node a 30-2 which is a macrocell base station and coverage area 20-5 related to node 30-4 which is another macrocell base station as well as the coverage area 20-6 related to the node 30-3 which is a microcell base station. Further yet, the network entity 110 may determine the overlap of the coverage area 20-7 related to node 30-5 which may for instance be related to a Wifi standard node or a WiMAX standard node and the coverage area 20-8 related to node 30-4. Further yet, the network entity 110 may determine the overlap of the coverage area 20-8 related to node 30-4, coverage area 20-9 related to node 30-6 which is a relay connected to node 30-4, and coverage area 20-10 related to node 30-7 which may for instance be a Wi-Fi router.

In one embodiment of the present invention the network entity 110 may consider all possible correlations, e.g. overlap, between the coverage areas related to the nodes in the network or may preselect for instance based on the location of the nodes likely correlations, e.g. overlap, between the coverage areas related to the nodes in the network in order to reduced processing load at the network entity 110. In other words, only passive use of coverage information was used conventionally. In the prior art one was able to tell whether a point is covered, a point is not covered, and/or whether a point is covered with a certain field strength. According to the embodiments of the present invention, however, active services by the coverage database may be employed.

In one embodiment of the invention coverage areas, also called coverage zones, of radio cells may be modeled as 3 dimensional (3D) spatial objects, or can be simplified as 2D or 1D objects placed in 3D space, e.g. individual floors of a building. The coverage database can provide various services in real-time, e.g. it may be possible to tell if one coverage zone is included in, or includes, or overlaps with another coverage zone. The database can provide a list of included, including or neighbor coverage zones in connection to another zone.

Network entity 110 stores the correlation information for instance in an appropriate form such as a table in a respective database indicating the overlap for the coverage areas 20-1 to 20-10.

FIG. 2A shows a schematic view of such a network entity 110. Specifically, the entity is configured to perform a method for selecting a radio access for a mobile terminal according to one or more embodiments of the present invention. The entity 110 generally comprises processing means 140, memory means 150 and, and communication means 160. As mentioned earlier, the entity may be connected to the network 100 via the communication means 160 and may be implemented as, for instance, a server, a computer, or processing resources provided by a data center or any suitable network element. Likewise, the entity 110 may be outside or inside the network 100, wherein any network node or element may be provided with the corresponding functionalities.

Generally, the above processing means 140 may be a processing unit, a processing unit collection, CPU, a share of a data/processing center and so on. The processing means 140 are capable of performing obtaining coverage information from a coverage information database for two or more nodes of a mobile communication network, obtaining configuration and/or state information from an inventory database for two or more nodes of a mobile communication network, and generating correlation information for two or more nodes correlating the obtained coverage information obtained from the coverage information database and the configuration and/or state information obtained from the inventory database.

Here, it should be noted that the network entity 110 may also be capable of performing other processes according to any of the embodiments described herein for the present invention. In particular, the network entity 110 may be capable of updating the coverage information database 120 and/or the inventory database 130. That is, the network entity 110 may be provided with the respective information relating to a coverage information for one of the nodes 30-1 to 30-7 and/or configuration and/or state information for one of the nodes 30-1 to 30-7, which are updated according to changes within the network. Such changes may for instance be reconfiguration of antennas or operating frequencies, addition of a new node at a new location or addition of a new coverage area for an already existing node that may for instance be related to the introduction of a new standard radio link or for instance temporary outage of one of the network nodes 30-1 to 30-7.

The memory means 150 may specifically store code instructing the processing means 140 during operation to implement any method embodiment of the present invention. Particularly, the memory means 150 may store code instructing the processing means 140 during operation to obtain coverage information from a coverage information database for two or more nodes of a mobile communication network, to obtain configuration and (or state information from an inventory database for two or more nodes of a mobile communication network, and generating correlation information for two or more nodes correlating the obtained coverage information using the configuration and/or state information obtained from the coverage information database in the configuration and/or state information obtained from the inventory database. The memory means 150 may further be used to store the correlation information for further use.

For instance in one embodiment of the present invention the communication means 160 may connect to the network 100. Through the communication means 160 the entity 110 may receive the coverage information from the coverage information database 120 and the configuration and/or state information from the inventory database 130. However, there may be more than one communication means to separately receive the coverage information from the coverage information database 120 and the configuration and/or state information from the inventory database 130. For instance there may be several and/or individual ports provided for receiving the coverage information from the coverage information database 120 and the local information from the inventory database 130 at the communication means.

Further, in one embodiment of the present invention the communication means 160 may be connected to several entities apart from the network 100 in order to receive the coverage information from the coverage information database 120 and the configuration and/or state information from the inventory database 130. For instance, there may be a data collection center storing the coverage information and the configuration and/or state information temporarily and/or are there may be a separate second data center for storing one of the coverage information and the configuration and/or state information which may be connected to the entity 110 through the communication means 160. In general, the network entity 110 may thus be provided with means to perform the method according to the embodiments of the present invention.

FIG. 2B shows a schematic view of a network entity 110' with regard to the above mentioned obtaining and generating. Specifically, it is shown a network entity 110' for performing a method for selecting a radio access for a mobile terminal comprising a first obtaining unit 111 configured to obtain coverage information from a coverage information database for two or more nodes of a mobile communication network; a second obtaining unit 112 configured to obtain configuration and/or state information from an inventory database for two or more nodes of a mobile communication network; and a generating unit 113 configured to generate correlation information for two or more nodes correlating the coverage information obtained from the coverage database and the configuration and/or state information of nodes obtained from the inventory database.

FIG. 2C shows a general mobile terminal embodiment of the invention for selecting a radio access for a mobile terminal. Specifically, it is shown a mobile terminal 10 in a mobile communication network having nodes, the mobile terminal 10 comprising a sending unit 11 to send a coverage report to a network entity according to a corresponding embodiment of the present invention.

FIG. 3 shows a flowchart of a method for selecting a radio access for a mobile terminal according to a general method embodiment of the present invention. This embodiment involves a step S110 obtaining coverage information from the coverage information database 120 for two or more nodes of a mobile communication network 100, wherein the coverage information may be maintained and/or updated at appropriate times as explained in further detail below.

In a step S120, before, after or simultaneously performed with step S110, configuration and/or state information may be obtained from an inventory database for two or more nodes of a mobile communication network. The step S110 for obtaining coverage information and the step S120 for obtaining configuration and/or state information may be carried out for all nodes 30-1 to 30-7 of interest in a network 100 at once or may be carried out for a single node of interest when it is necessary to carry out further steps according to one or more embodiments of the present invention. Naturally, the sequence of step S120 following step S110 is not fixed, so that also step S120 may be performed before step S110, or the coverage information and the configuration and/or state information are obtained in parallel or alternately in a combined obtaining step S121. The method further comprises the step of generating S130 correlation information for two or more nodes correlating the obtained coverage information and the configuration and/or state information. Such a correlation may be based on an overlap of a coverage area for at least two nodes 30-1 to 30-7. However, any other suitable correlation may be used.

In another embodiment of the invention the method may further comprise an optional step of updating the correlation information upon the occurrence of an event. Such an event may be determined beforehand to be periodic, dynamic, or upon request. For instance, by setting an event of the "periodic" type the updating step may be performed repeatedly in appropriate time periods. Up to date information for selecting a radio access for a mobile terminal may be guaranteed. Further, a specific event may be used to trigger updating the correlation information such as an outage of a specific coverage area for a given node or an outage of an entire node where potentially many mobile terminals have to be handed over to different nodes or connected to different radio access provided by the same node where many radio accesses have to be selected for the mobile terminals. Further yet, the event may be triggered by a mobile terminal which suffers from a radio access with a poor connection quality.

In one embodiment of the present invention coverage information may be the field strength of for instance 2G, 3G, or 4G networks, and the coverage database may not provide information on how the coverage of particular 2G, 3G, or 4G cells are related to each other. For example, in case of a radio cell failure, one may want to know, e.g. from a database query, the 3G cells, which cover a particular 4G cell. Such info is useful in compensation of cell outages or in planning inter-Radio Access Technology (inter-RAT) load balancing and carrier aggregation. According to the prior art it has been sufficient that the terminals initiate handovers after scanning the available network services. But the cell and carrier selection process may need to be faster in order to avoid radio connection failures or session drops, especially if a large variety of alternative connections may be available.

Traffic steering and carrier aggregation issues are expected to be much more complicated in heterogeneous networks than in current 2G, 3G, and 4G macrocell environments. It may consume considerable amount of resources and time on the terminal side to survey all possible radio access connections, i.e. to take measurements, find beacons and to read broadcast information from cells at various frequency bands and radio access technologies. The network side should closely assist terminals in network discovery and should have a control over cell selection and carrier aggregation. Prompt and detailed knowledge of the macro-, micro- and picocell or any other coverage hierarchy of for instance a multi-Radio Access Technology (RAT) network may be useful for radio resource allocation on the network side and service quality on the user side.

Scanning for potential radio connections may be time and energy consuming for the user terminals. Inter-frequency measurements may suspend ongoing services for short time periods. In certain RATs, e.g. WiFi, the radio discovery process may consume random access resources from the network side. Therefore network-driven scanning of the radio environment may save resources both at the user and network sides.

Nodes in heterogeneous networks may not be fully controlled by an operator, especially at higher frequencies, where radio propagation may be limited and equipment such as nodes may be partially controlled by the owner of premises. When users are radio-wise connected to small cells or unreliable nodes, the network side may have to immediately assist users when loosing coverage. Besides coverage information, network management should be up to date knowing the status of small cells even if the operation of nodes relies on external services, e.g. leased backhaul lines. It may be desirable that a compound cell state and coverage knowledge is promptly available to central network management.

Current wireless technologies heavily rely on autonomous network discovery, which means that mobile terminals periodically spend time and energy to scan frequency bands and other types of RATs. As the variety of RATs and operating frequency bands keep on increasing, autonomous scanning may become slow and inefficient.

According to one embodiment of the invention so called network-assisted scanning, that is the network instructs and triggers terminals what to scan for, may be a technique, which can keep a discovery procedure manageable for instance in multi-RAT, multi-frequency heterogeneous networks. However, a traffic steering logic in network management, which triggers the network measurements and controls the handover and carrier aggregation, may use coverage maps, which are detailed to the level of antenna beams and which track network reconfigurations for instance in real-time.

That is, in other words, the traditional central telecom inventory database may be augmented with a coverage information database, which may also be called a geographical information system (GIS), which is a cell coverage database. Coverage areas, also called coverage zones, for instance according to RATs, frequency carriers and bandwidths may be distinguished in the augmented database. Spatial and timely information on forbidden frequency bands, e.g. those that are primarily allocated to military or satellites, may also be part of this database in order to allow dynamic frequency allocations without spectrum conflicts.

The cell coverage information database may be a distributed database, so that local knowledge is stored and maintained in regional centers and the processing means 140 of the network entity 110, which may also include a so-called decision logic, may be implemented as a network function. The cell coverage information databases may be for instance partially built by plug and play and automatic learning processes.

In other words, the coverage information database may be capable of examining self-integrity and performing self-corrections if needed. In one embodiment of the invention, the coverage information database may process user terminal measurements in order to fine-tune coverage areas, i.e. coverage zones, and inter relations among coverage zones. In another embodiment of the invention, the coverage information database may monitor the states of associated cells and/or radio nodes in order to provide cell-state dependent coverage information.

The network entity 110, which may be called a central network management logic, may use the services of the coverage database when it instructs terminals for monitoring certain radio connections, performing inter-RAT handovers, switching on carrier aggregation, etc.

In another embodiment of the present invention the method may further comprise the step of updating the correlation information using a coverage report received from a mobile terminal. In other words, the detailed coverage information database may be initially built by network planning tools and fine-tuned by field tests, and then may be continuously verified and updated from terminal measurements. Hierarchical relationships among the geometrical, topological, semantical, and appearance properties of coverage zones may be automatically learnt from user and cell trace logs, similar to the case of ANR tables.

Further, according to yet another embodiment of the present invention the method may comprise storing correlation information in the coverage overlap information database. In other words, in a distributed architecture, the detailed coverage information may be automatically learnt from user and cell trace logs, be stored, managed and learnt on a regional level, and management traffic may only load backhaul when coverage information is actually used. Such a coverage database subsystem may be implemented as a virtual network function.

In a way, the network entity 110 may use a subsystem to network management being a combination of Geographical Information System (GIS) and inventory databases. The level of geographical detail in the GIS of coverage may vary from room size to geographical regions. The coverage zones may be typically tied to an antenna beam, and higher level compound zones may be derived from the single coverage zones based on the hierarchy of network elements. The network inventory and GIS databases may be tightly coupled via cross references.

The network entity 110 may further comprise as processing means 140 so called GIS the GIS engine may not just compute the geographical representation of compound coverage zones, but it may create and maintain tables that describe the relationships among single and compound coverage zones. These relationships can express inclusion, overlap and neighborhood. GIS may provide further details on coverage, e.g. the field strength.

Each geographical object may be tied to a single or multiple or aggregated or filtered element in the network inventory database. As networks may be reconfigured, the coverage info should be updated, as well. In order to keep the coverage and inventory databases coherent, the state of configuration changes of network elements should trigger recalculation of relational tables, for instance in real time. Therefore, the initial fill up and later update in the coverage database may be performed with the help of a radio planning tool, which can provide an estimate for the coverage zones. Compound coverage zones may be derived based on the semantic and hierarchic relationships among network elements. As measurements and events continuously arrive from a live network, network management may improve the quality coverage info, which can be fed back to the coverage database.

Figure 4:
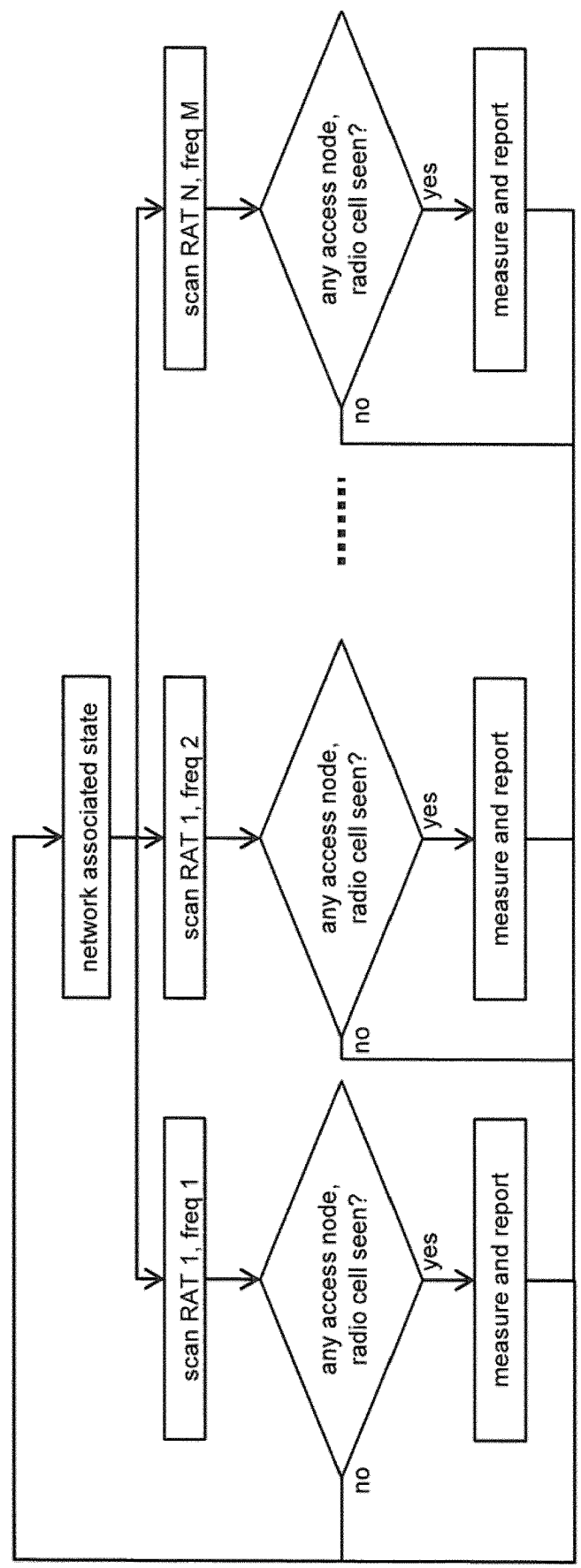
FIG. 4 shows a schematic overview of discovering a radio access for selecting a radio access for a mobile terminal according to a further embodiment of the invention.

FIG. 4 shows a schematic overview of discovering a radio access for selecting a radio access for a mobile terminal according to a further embodiment of the invention. Specifically, FIG. 4 shows a procedure which terminals may apply to discover alternative connections while camped or connected to a mobile communication network. In many cases, when the terminal scans for an alternative RAT or frequency carrier, it may suspend its active connection for short periods. The more frequencies and RATs to be scanned, the more time and energy has to be spent on environment discovery. Scanning for different RATs and frequency bands can happen asynchronously or on some event trigger or it can happen periodically. As more types of RATs and operating frequency bands join the wireless services, the more time and resources are demanded both on the terminal and network sides.

Figure 5:
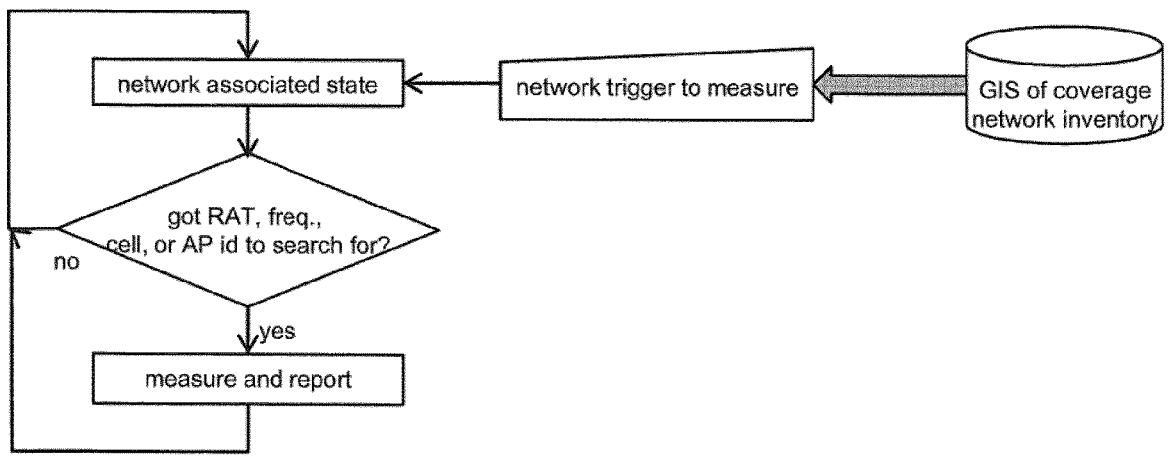
FIG. 5 shows a method for discovering a radio access for selecting a radio access for a mobile terminal according to another embodiment of the present invention.

FIG. 5 shows a method for discovering a radio access for selecting a radio access for a mobile terminal according to another embodiment of the present invention. Specifically, the radio-network discovery process depicted in FIG. 4 may be partially replaced by network-assisted discovery, which is shown in FIG. 5. When the network logic suggests that an alternative connection or bandwidth aggregation could be beneficial to a particular user or to other users, or to the network as a whole, then the network requests the particular terminal to take measurements on specific RATs or frequency bands, or on specific cells or access points. The network entity 110, also called network decision logic, may utilize the integrated coverage and inventory database in order to avoid scanning of unnecessary RATs and frequency bands.

Further, according to yet another embodiment of the present invention the method may further comprise determining radio access for the mobile terminal. For instance in one embodiment of the present invention, the procedures that may be needed to execute network assisted handovers may be standardized. For example, LTE, i.e. 3GPP TS 36.331, Radio Resource Control (RRC) Protocol specification, specifies how the network requests inter-frequency, inter-RAT measurements from connected user terminals and how the network sends reconnection information to terminals in order to speed up inter-RAT handovers.

Other types of RATs, like WiFi, may rely more on the autonomous discovery procedure, and they may not have control plane tools to aid user terminals to find and switch to the most optimal radio connection. However, when other systems integrate the radio access over licensed and non-licensed frequency bands, a common network management may be able to steer mobile terminals between these bands, especially if the coverage information of both are united in a common database system according to the present invention.

The basic use for the coverage information database in one embodiment of the present invention is described below. Network management may continuously track the active mobile terminals and it may execute the following procedure for each mobile terminal. The network side may estimate the location and speed and/or direction of motion of the particular active mobile terminal. A rough estimation may be possible from radio link measurements taken both at the network and mobile terminal sides. Potentially other sources of location info such as GPS may also be used if available. The network side may keep on searching alternative connections for the particular mobile terminal. It may look up the coverage zones that overlap or are in the neighborhood of the mobile terminal. It may evaluate the service quality possibly available to the mobile terminal on the alternative connections. It may determine if the mobile terminal is a candidate of traffic redirection or some form of carrier aggregation. The network may instruct the mobile terminal to take dedicated measurements on target connection endpoints, which may be at different RAT and/or frequency bands. The network may estimate a user experience achievable over the alternative radio accesses, also called connections, based on the measurement report that the mobile terminal sent. The network may initiate the traffic steering or carrier aggregation action for the mobile terminal if the radio conditions are sufficient and either user-centric or higher-order management goals can be met.

In another embodiment of the invention, the maintenance of coverage information database may continuously track the configuration and state changes in the network.

In another embodiment of the invention, an SON algorithm, such as ANR or a similar, may process the mobile terminal and network measurements, for instance in real time, and it may tune and elaborate the coverage zones, as well as, the correlation information, which may be stored in relational tables in the database.

In a further embodiment the method according to the present invention may further comprise the steps of determining a location of a mobile terminal and the selecting a radio access for the mobile terminal based on the correlation information in the determined location.

Figure 7:
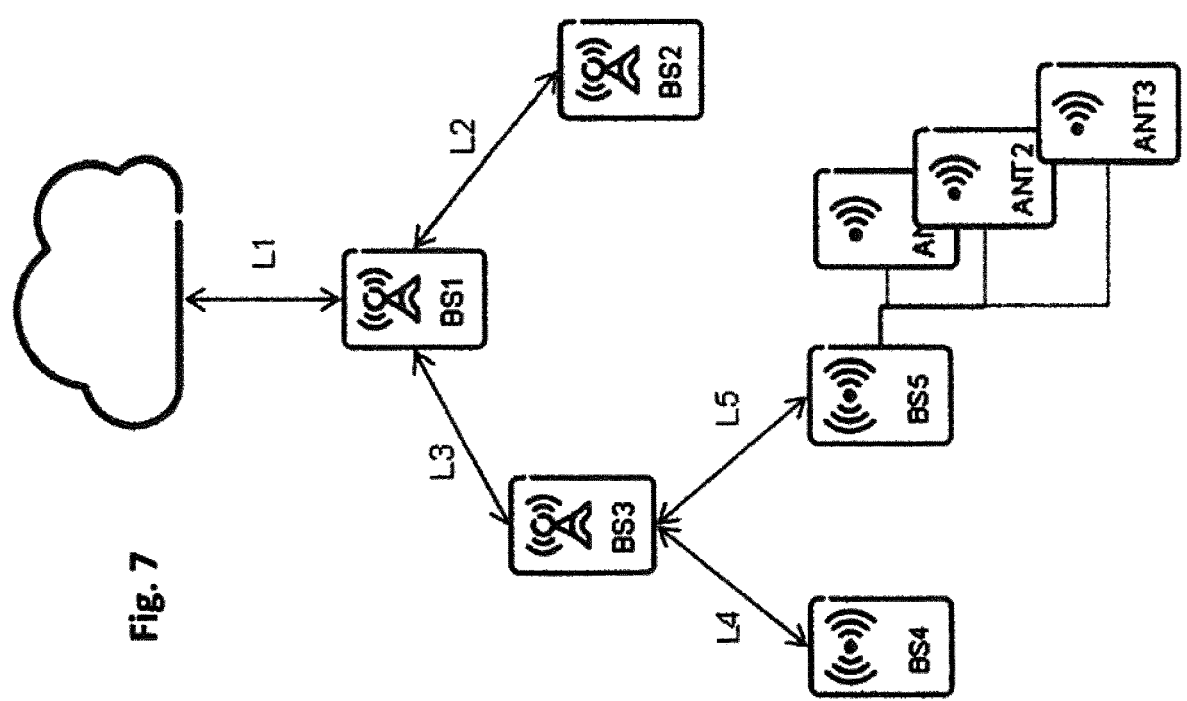
FIG. 7 shows a schematic overview of another exemplary network environment in which a radio access for a mobile terminal is selected according to another embodiment of the present invention.

FIG. 7 shows a schematic overview of another exemplary network environment in which a radio access for a mobile terminal is selected according to another embodiment of the present invention. Specifically, FIG. 7 depicts a radio access network segment to be used in the following examples. BS1 may be a macro base station which also may serve as a backhaul hub in a core network. BS1 is connected to the core network via link L1, such as a fiber or copper link. Base stations BS2 and BS3 may also be macro base stations, which are connected to BS1 via for instance microwave links, L2 and L3, respectively. BS4 and BS5 may be micro base stations in the close vicinity of BS3 and they may be connected to BS3 via cables L4 and L5, for instance fiber or copper cables. BS5 may have two outdoor cells, and in addition, an indoor cell with a distributed antenna system.

Figure 8:
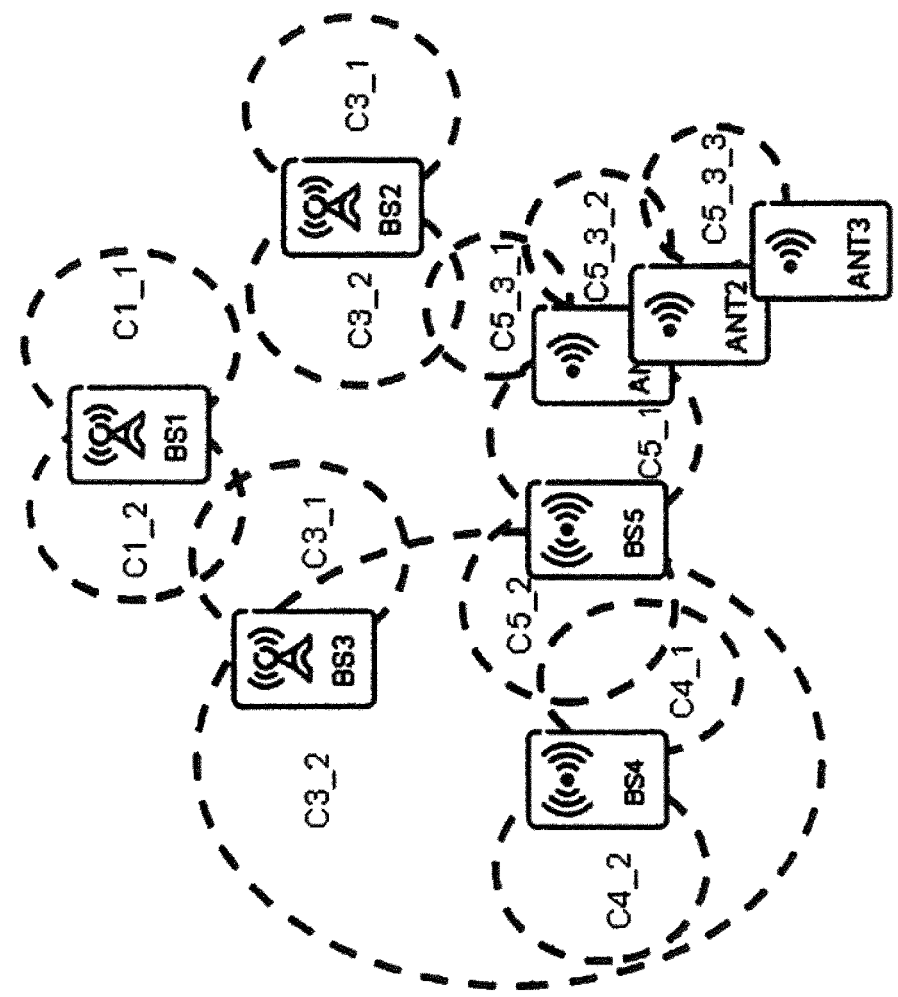
FIG. 8 shows a schematic overview of coverage areas related to the exemplary network environment as shown in FIG. 7.

FIG. 8 shows a schematic overview of coverage areas related to the exemplary network environment as shown in FIG. 7. Specifically, it may be assumed that the network elements in FIG. 7 may have coverage zones symbolized by the dashed ovals in FIG. 8. For simplicity, however, coverage zones are associated with antennas in this example, but they may be referenced to higher-level network elements, e.g. to entire base stations.

Figure 6:
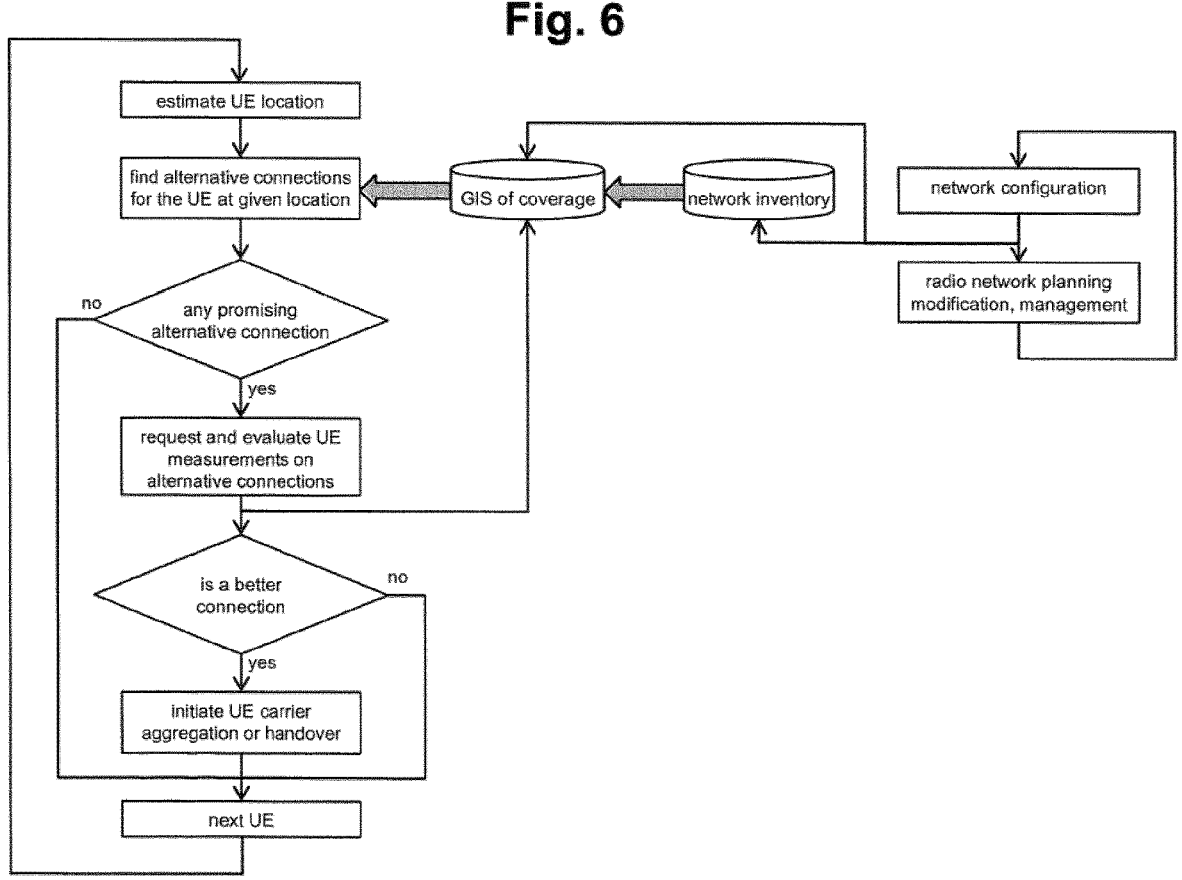
FIG. 6 shows a schematic overview for selecting a radio access for a mobile terminal according to yet another embodiment of the present invention.

FIG. 6 shows a schematic overview for selecting a radio access for a mobile terminal according to yet another embodiment of the present invention. The processes in Figure may utilize the coverage knowledge and hence can save resource, energy and time. One consequence of missing or inaccurate coverage information may be that the user terminal and network has to fall back to the basic autonomous discovery procedures of network attachment and reattachment.

The so called GIS engine, provided for the network entity 110, may be flexible in handling geometrical features, and may provide all feature definitions that a coverage map as shown in FIG. 8 may need. Even raster images may be included in most GIS systems. The above example contains oval, polygon and raster images as geometric features.

3-dimensional geometrical objects may be also used in more complex coverage scenarios, such as for picocells in a multi-floor building. In other words, it may be the role of the GIS engine to automatically compute compound coverage zones from the coverage zones based on the network hierarchy and to associate them with larger network nodes or with network segments, which may be compound items in the network inventory. The union of geometrical features can be computed on the fly or can be recomputed as soon as one of the involved geometrical features is reconfigured.

In another embodiment of the present invention the GIS engine can also automatically compute a matrix, which describes the neighborhood relationships among coverage zones. All coverage zones, single and compound, can be checked if they overlap with any other zone. This matrix may be sparse and symmetric. A table may contain a value of 1 if the coverage zones marked by the row and column headings overlap.

The neighborhood relation matrix can be also refined based on user measurements as in the case of ANR. Observation from handovers and network discovery scans can probabilistically strengthen or weaken relationships suggested by the GIS engine.

Further yet, according to another embodiment of the present invention the method may comprise a step of sending an instruction to use the selected radio access to the mobile terminal. In other words, when a user is associated with one of the coverage zones, network management may review the load situation in other zones, which the neighborhood table indicates as neighbors. If overall service or user experience can be potentially improved with user transfer, or there may a potential for carrier aggregation, then the user terminal may be instructed to take measurement on neighboring network access points. The user terminal may be supplied with the carrier frequency, timing info, physical cell id, random access code, etc., whatever helps in the given RAT to achieve quick channel assessment.

Further, according to yet another embodiment of the present invention the method may comprise performing connecting to a determined radio access by the mobile terminal.

In another embodiment of the invention GIS engines can automatically build a more advanced geometrical hierarchy table than the table of neighborhood relations. This table may tell more about inclusion and overlap among coverage zones. Assume the row in this table belong to coverage zone A. The cell in this row and in the column of coverage zone B tells how large part of coverage zone A is also part of coverage zone B. A value of 1 may mean that coverage zone A is fully covered by coverage zone B. A value lower than 1 may mean only partial overlap and, in practice, it also may mean a lower chance to steer the user to the alternative coverage zone. This metric would result in a non-symmetric, non-negative matrix, and can further help to narrow the search scope for the ideal alternative connection.

In a way, FIG. 9 shows part of the overlap matrix corresponding to the coverage zones depicted in FIG. 8. The values are only examples, the invention is not limited to these values. However, not just the geometrical overlap, but measurement and handover statistics may be taken into account so that the network may initiate only measurements to explore the most probable candidate connections. Whenever the location of a user can be associated to any of the coverage zones, the non-zero elements of the row that corresponds to the particular coverage zone can be checked for potential alternate connection or carrier aggregation. For instance a SON algorithm may decide if the traffic steering to an alternate connection is beneficial or not.

In other words, herein is described a hierarchical geographical information system (GIS) on network coverage, and the detail of the coverage information may be ranging from the coverage of individual antennas, antenna beams to the coverage of network regions. The coverage zones can be up to 3D geographical objects. The GIS of coverage may extend to all frequency bands and radio access technologies that the mobile network service involves, as well as, to the coverage zones and frequency bands that the service may not allowed to use. The deployment of heterogeneous networks for instance involving various 3GPP and Wi-Fi technologies, coverage maps describing the overall mobile service may become much more complex than they are at present.

In one embodiment the GIS of coverage may be in tight integration with the inventory database, which may be a network inventory and configuration database, so whenever a coverage zone or network node configuration changes, the other database may also be updated for instance in real time. The GIS engine may update cross references for instance in real-time. The cross references can be direct, e.g. between an antenna device and its footprint, or it can be indirect, e.g. the coverage zone of a macro base station is derived from the coverage zones of its cells.

In another embodiment of the present invention the coverage information database, which may be an integrated coverage and network database, may be available to network management for instance in real-time, so instantaneous decisions on inter-frequency, inter-RAT handovers and carrier aggregations of individual users may be based on up-to-date coverage information.

In another embodiment of the present invention information into the coverage database can be input from radio planning tools, from driving tests and from user measurements. The coverage information can be approximate and, in case of inaccurate information, the fallback procedures for handover and carrier aggregation can be used. However, correct information may speed up the handover and carrier aggregation procedures and may save radio resources and energy both at the terminal and network sides.

In another embodiment of the invention the information that the coverage database provides to user and network management may be the instantaneous neighborhood relationship, and the degree of overlap among coverage zones, which can be single or compound zone. The GIS engine may immediately recalculate the relevant coverage zones and overlap relationships if the configuration or state of a network element, e.g. antennas, cells, base stations, changes.

Further, according to yet another embodiment of the present invention the method may comprise transmitting information on the determined radio access to the mobile terminal. In other words, the user and node management solution backed up by the detailed geographical information system of coverage may allow building real-time traffic-steering, load-balancing control, which facilitates better user experience in wireless network services, improves utilization of radio resources, reduces the amount of management traffic over the wireless links, saves energy and wireless resources both at the user and network sides, decreases latency in wireless service discovery and connection switching. Control from the network management may optimize tradeoffs according to the operators prioritization policy.

In one embodiment of the invention coverage areas or zones of radio cells may be modelled as 3-dimensional (3D)

spatial objects, or may be simplified as 2D or 1D objects placed in 3D space, e.g. individual floors of a building.

In one embodiment atomic coverage zones may be tied to an antenna beam or cell, and higher level compound zones, e.g. for base stations, distributed antenna systems, may be derived from the atomic coverage zones based on the hierarchy of network elements.

In one embodiment of the invention node states and node configurations may play a role, since they may be constantly changing factors in the environment, which should be adapted to with the new coverage database, for instance in real-time.

In one embodiment of the invention node state may include such properties as the load on various hardware resources, measurements on interference, congestion situation on backhaul, presence of disturbances, alarms, and On/Off situation of cells.

One embodiment of the invention considers node configurations, which may affect coverage or which the terminal may need in order to perform measurements, handovers and/or carrier aggregations. This may be one or more of the following antenna/beam positioning, operating frequencies, physical cell ids, time advance settings, synchronization settings, energy-saving settings.

In one embodiment of the invention one may have the current access information of the terminal, i.e. one knows the cell(s) it is attached to. Subsequently one may have a rough estimate on the coverage zones of that (those) cell(s), where the terminal is. Further, one may know from the coverage database the neighbor, overlapping coverage zones, as well as the nodes that these zones belong to. Further, one may extract configuration and state information from the inventory database for the cross referenced nodes. Further yet, one may request measurements for part of those nodes from the terminal, may evaluate the measurement results, and may supply the terminal with detailed handover information and may request the terminal to make a handover. In other words, one may correlate coverage zones with node states and node configurations.

In one embodiment of the invention the coverage database contains the geometrical models of atomic and compound coverage zones and the inclusion relations among these zones. Any configuration change in the nodes may trigger the recalculation of the related geometrical models and relationships of zones, for instance on the fly.

In one embodiment of the invention the method may further comprise a step of sending an instruction to the mobile terminal with connection information to measure quality on the selected radio access. For example, it is first measured on candidate connections, and it is then evaluated and decided on a connection afterwards. In a further embodiment, in the instruction one may send dedicated connection information to the terminal, e.g. random access code, which may allow the terminal to bypass one or more steps in the attachment process.

In one embodiment of the invention there are steps, wherein first the network sends info on alternative radio accesses to a terminal in order to evaluate, i.e. to take measurements, and then upon receiving the results the network may initiate a handover or carrier aggregation by also supplying dedicated connection information on the selected radio access.

In one embodiment of the invention the method may be such in which the coverage information comprises at least information of frequency carriers, bandwidths, field strength, spatial and timely information on forbidden frequency bands.

In one embodiment of the invention the method may be such in which the location information comprises information about the hierarchy of the nodes. In other words the coverage zones from atomic to compound zones may be organized in hierarchy.

In one embodiment of the invention the method may be such in which the event is a change of network nodes in the mobile telecommunication network. In other words, events may be node configuration changes affecting coverage.

In one embodiment of the invention the location of the network entity may be defined in the network.

Further embodiments of the invention may include one or more of the following cell coverage database may be a distributed database, cell coverage databases may be partially built by plug and play and automatic learning processes, coverage areas or zones of radio cells may be modeled as 3 dimensional (3D) spatial objects, or can be simplified as 2D or 1D objects placed in 3D space, the coverage database may process user terminal measurements in order to fine-tune coverage zones and inter relations among coverage zones, the coverage database may monitor the states of associated cells/radio nodes in order to provide cell-state dependent coverage information, the detailed coverage database may be initially built by network planning tools and fine tuned by field tests, and then can be continuously verified and updated from terminal measurements, in a distributed architecture, the detailed coverage information may be stored, managed and learnt on a regional level, and management traffic only loads backhaul when coverage information is actually used, the coverage database subsystem may be implemented as a virtual network function, the level of geographical detail in the GIS of coverage may vary from room size to geographical regions, the initial fill up and later update in the coverage database may be performed with the help of a radio planning tool, compound coverage zones may be derived based on the semantic and hierarchic relationships among network elements, network management may improve the quality coverage info, which can be fed back to the coverage database, the maintenance of coverage database may continuously track the configuration and state changes in the network, a SON algorithm, such as ANR or a similar, may process the UE and network measurements in real time and it may tune and elaborate the coverage zones, as well as, the relational tables in the database, raster images may be included in most GIS systems, the cross references may be direct, e.g. between an antenna device and its footprint, or it may be indirect, e.g. the coverage zone of a macro base station may be derived from the coverage zones of its cells, information into the coverage database may be input from radio planning tools, from driving tests and from user measurements. Further processing and aggregating user terminal measurements over longer periods may be part of learning.

Although detailed embodiments have been described, these only serve to provide a better understanding of the invention defined by the independent claims and are not to be seen as limiting.

The invention claimed is:

1. A method for selecting a radio access for a mobile terminal in a mobile communication network, the method comprising:
   obtaining coverage information from a coverage information database for two or more nodes of the mobile communication network;
   obtaining configuration and/or state information from an inventory database for the two or more nodes of the mobile communication network; and generating correlation information for the two or more nodes correlating the coverage information obtained from the coverage database and the configuration and/or state information of the two or more nodes obtained from the inventory database.

2. The method of claim 1, wherein the obtained coverage information indicates any one of a coverage area, a model of one or more coverage zones, a geometrical model of an atomic coverage zone, and a compound coverage zone.

3. The method of claim 1, wherein the obtained configuration and/or state information indicates any one of a node state, a node configuration, and a node location.

4. The method of claim 1, wherein the correlation information for the two or more nodes indicates an overlap of a coverage area for at least two nodes.

5. The method of claim 1, further comprising updating the correlation information upon the occurrence of an event.

6. The method of claim 5, wherein the event is a change of network nodes in the mobile communication network.

7. The method of claim 1, further comprising updating the correlation information using a coverage report received from the mobile terminal.

8. The method of claim 1, further comprising:
determining a location of the mobile terminal;
selecting a radio access for the mobile terminal based on the correlation information and the determined location.

9. The method of claim 8, further comprising sending an instruction to the mobile terminal with connection information to measure quality on the selected radio access.

10. The method of claim 8, further comprising transmitting information on the selected radio access to the mobile terminal.

11. The method of claim 8, further comprising performing connecting to the selected radio access by the mobile terminal.

12. The method of claim 1, further comprising storing correlation information in a coverage overlap information database.

13. The method of claim 12, wherein overlap information in the coverage overlap information database comprises a relation between atomic and compound zones.

14. The method of claim 13, wherein an atomic zone is the coverage of an antenna.

15. The method of claim 13, wherein an atomic zone is the coverage of a cell.

16. The method of claim 13, wherein a compound zone is an addition of two or more atomic or other compound zones.

17. The method of claim 13, wherein the overlap information comprises information about a hierarchy of the nodes.

18. The method of claim 1, wherein the coverage information comprises at least information of frequency carriers, bandwidths, field strength, spatial and timely information on forbidden frequency bands.

19. A network entity for performing a method for selecting a radio access for a mobile terminal, the network entity comprising:
processing circuitry;
memory containing instructions executable by the processing circuitry whereby the network entity is operative to:
obtain coverage information from a coverage information database for two or more nodes of a mobile communication network;
obtain configuration and/or state information from an inventory database for the two or more nodes of a mobile communication network; and
generate correlation information for the two or more nodes correlating the coverage information obtained from the coverage database and the configuration and/or state information of the two or more nodes obtained from the inventory database.

20. A non-transitory computer readable recording medium storing a computer program product for controlling a network entity for selecting a radio access for a mobile terminal in a mobile communication network, the computer program product comprising software instructions which, when run on processing circuitry of the network entity, causes the network entity to:
obtain coverage information from a coverage information database for two or more nodes of the mobile communication network;
obtain configuration and/or state information from an inventory database for the two or more nodes of the mobile communication network; and
generate correlation information for the two or more nodes correlating the coverage information obtained from the coverage database and the configuration and/or state information of the two or more nodes obtained from the inventory database.

* * * * *